United States Patent [19]

Shibata

[11] 4,257,078
[45] Mar. 17, 1981

[54] READ DEVICE FOR PLANE MAGNETIC RECORDING MEDIUM

[75] Inventor: Fujio Shibata, Tokyo, Japan

[73] Assignee: TDK Electronics Co., Ltd., Tokyo, Japan

[21] Appl. No.: 20,062

[22] Filed: Mar. 13, 1979

[30] Foreign Application Priority Data

Apr. 10, 1978 [JP] Japan ............................ 53/46758[U]

[51] Int. Cl.³ ...................... G11B 15/60; G11B 5/012
[52] U.S. Cl. ................................. 360/130.34; 360/99
[58] Field of Search ............. 360/130.34, 130.2, 130.3, 360/130.32, 130.34, 97–99

[56] References Cited

U.S. PATENT DOCUMENTS

| | | | |
|---|---|---|---|
| 3,493,693 | 2/1970 | Balint | 360/130.32 |
| 3,747,938 | 7/1973 | Hilst et al. | 360/130.31 |
| 3,879,757 | 4/1975 | Elliot et al. | 360/130.34 |
| 4,012,791 | 3/1977 | Bleiman | 360/130.34 |

FOREIGN PATENT DOCUMENTS 176086  7/1961  Sweden ............................. 360/130.32

OTHER PUBLICATIONS

IBM Tech. Dis. Bull., W. K. Balcezak et al., Dual-Magnetic Head Pad, vol. 18, No. 8, Jan. 1976, p. 2399.
IBM Tech. Dis. Bull., E. A. Halter et al., Tape Lifter and Guide Mechanism, vol. 9, No. 12, May 1967, p. 1710.

Primary Examiner—Alfred H. Eddleman
Attorney, Agent, or Firm—Oblon, Fisher, Spivak, McClelland & Maier

[57] ABSTRACT

A read device for reading magnetic data stored in a plane magnetic recording medium comprises a magnetic head for reading magnetic data stored in a rotatable flexible plane magnetic recording medium and a pad pushing a rear surface of the magnetic recording medium to a direction of the magnetic head so as to contact the front surface of the magnetic recording medium with the magnetic head, and means for adjusting a projected distance of the pad to the magnetic recording medium.

3 Claims, 2 Drawing Figures

READ DEVICE FOR PLANE MAGNETIC RECORDING MEDIUM

BACKGROUND OF THE INVENTION

1. Field of the Invention

The present invention relates to a read device for reading magnetic data stored in a flexible plane magnetic recording medium.

2. Description of the Prior Arts

The read devices for reading magnetic data shown in FIG. 1 have been known.

In the conventional read devices, a chuck (4) mounted at the end of a rotary shaft (3) is fitted to a center hole (2) of the disc magnetic recording medium (1) which is prepared by coating a magnetic powder layer on a flexible substrate such as polyester substrate and the shaft (3) is rotated to rotate the recording medium (1) and on the other hand, the rear surface of the disc magnetic recording medium is pushed down by a pad (7) made of an elastic contact (6) such as felt held by a supporter (5) whereby the front surface (1a) as the recording surface of the magnetic recording medium (1) is contacted with the magnetic head (8) so as to read-out the magnetic data on the recording surface.

A pair of the pad (7) and the magnetic head (8) move on the disc magnetic recording medium (1) to the radial direction and the rotary direction to pick up the magnetic recorded data.

However, when the working term is long as 1000 to 3000 hours, the felt as the elastic contact (6) for the pad (7) is worn to decrease the pushing force whereby a contact pressure between the magnetic head (8) and the magnetic recording medium (1) is gradually decreased to fluctuate the reproducing output or to decrease the reproducing output disadvantageously.

SUMMARY OF THE INVENTION

It is an object of the present invention to overcome the disadvantages of the conventional read device.

It is another object of the present invention to provide a read device for improving stability and reliability by adjusting a contact pressure between the magnetic recording medium and the magnetic head in constant and preventing fluctuation of reproducing output.

The foregoing and other objects of the present invention have been attained by providing a read device for reading magnetic data stored in a plane magnetic recording medium which comprises a pad whose projected distance to the recording medium can be adjusted.

BRIEF DESCRIPTION OF THE INVENTION

DETAILED DESCRIPTION OF THE PREFERRED EMBODIMENTS

Figure 1:
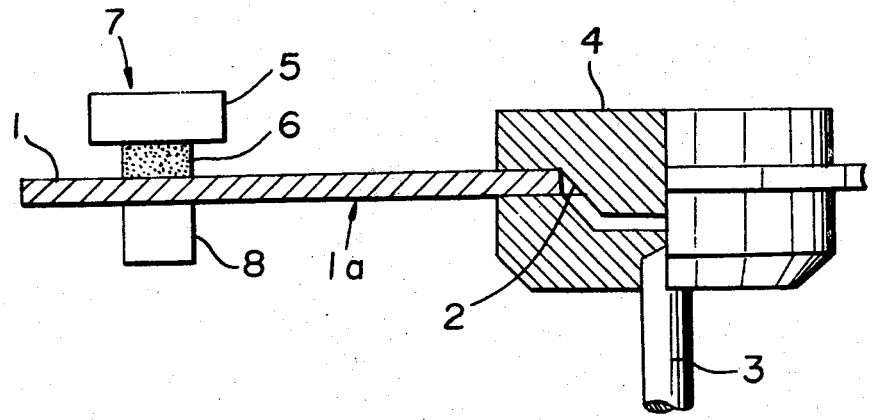
FIG. 1 is a schematic view of the conventional read device.

Referring to the drawings, the present invention will be illustrated.

Figure 2:
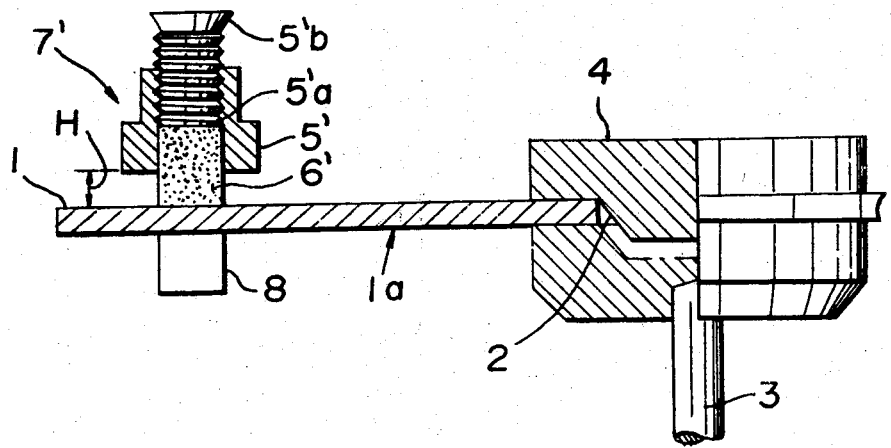
FIG. 2 is a schematic view of the read device for reading magnetic data stored in a plane magnetic recording medium of the present invention.

In FIG. 2, the disc magnetic recording medium (1) is prepared by coating a magnetic powder layer on a flexible substrate such as polyester substrate and the chuck (4) mounted at the end of a rotary shaft (3) is fitted to the center hole (2) of the magnetic recording medium (1) to rotate the magnetic recording medium (1) by rotating the shaft (3). The pad (7') made of an elastic contact (6') such as felt which is held on the supporter (5') is used for pushing the front surface of the magnetic recording medium (1) downwardly to contact the front surface (1a) as the recorded surface of the magnetic recording medium with the magnetic head (8) whereby the magnetic data stored on the recorded surface are read.

In the present invention, a female screw (5'a) is formed in the supporter (5') for the pad (7') and the elastic contact (6') made of felt etc. is fitted to the lower part of the female screw (5'a) and a male screw (5'b) is screwed from the upper side of the female screw (5'a) whereby the projected distance H of the elastic contact (6') is adjusted.

When the elastic contact (6') is worn by a long working, the male screw (5'b) is screwed in to adjust the projected distance H of the elastic contact (6') for the distance corresponding to the worn length whereby the contact pressure generated between the recorded surface (1a) of the magnetic recording medium (1) and the magnetic head (8) is adjusted to be constant and the reproducing stability is improved.

The projected distance "H" of the pad can be controlled by screwing a screw press to press down the pad for the screwed distance so as to impart suitable pressure against the magnetic head. The rotation of the pad can be substantially decreased in shifting downwardly the pad from the hole of the female screw.

Various kinds of the male screw can be considered to move downwardly against the recording medium and the magnetic head. The male screw may be adjusted once an year or longer depending upon the wearing of the elastic substrate such as felt.

The contact pressure is preferably only slightly higher than that of the force bending the disc flexible magnetic recording medium.

As shown in the above-mentioned description, the present invention is to have the feature for adjusting the projected distance of the pad to the disc magnetic recording medium in the read device for reading magnetic data stored in a rotated flexible plane magnetic medium which comprises a magnetic head for reading the magnetic data and the pad pushing the rear surface of the magnetic recording medium to the direction of the magnetic head so as to contact the front surface of the magnetic recording medium with the magnetic head whereby the variation of the contact pressure caused by wearing the pad can be calibrated to maintain the contact pressure between the magnetic head and the magnetic recording medium in constant to stabilize the reproducing output and to improve the reliability.

What is claimed is:

1. In a read device for reading magnetic data stored in a plane magnetic recording medium, comprising:
a magnetic head for reading magnetic data stored in a rotatable flexible plane magnetic recording medium; a pressure pad support mounted adjacent a rear surface of the recording medium and spaced a predetermined distance from the recording medium; and a pressure pad carried in the support and projecting therefrom toward and into contact with the rear surface of the magnetic recording medium to urge the recording medium in a direction of the magnetic head so as to contact a front surface of the magnetic recording medium with the magnetic head, the improvement comprising screw means carried by the support and engaging the pad for adjusting a projected or displaced distance of the pad toward the magnetic recording medium, to thereby compensate for wear and the like.

2. A read device according to claim 1 wherein said screw means for adjusting a projected distance of the pad is a female screw thread in the pad support, and a threaded male screw engaged therewith.

3. A read device according to claim 1 wherein said pad support has a hole therethrough with said female threads formed therein, said pad comprising a felt pad disposed in said hole and having a portion thereof projecting from the hole into contact with the rear surface of the recording medium, said threaded male screw engaging the felt pad in the hole of the support to positively adjust the projected distance of the pad from the hole when the screw is turned.

* * * * *